United States Patent [19]

Hergenrother et al.

[11] Patent Number: 5,498,803
[45] Date of Patent: Mar. 12, 1996

[54] POLY(ARYLENE ETHER)S CONTAINING PENDENT ETHYNYL GROUPS

[75] Inventors: Paul M. Hergenrother, Yorktown; Brian J. Jensen, Williamsburg, both of Va.

[73] Assignee: The United States of America as represented by the Administrator of the National Aeronautics and Space Administration, Washington, D.C.

[21] Appl. No.: 209,504

[22] Filed: Mar. 7, 1994

[51] Int. Cl.$^6$ .................. C07C 43/215; C07C 43/225
[52] U.S. Cl. .................. 568/646; 568/637; 568/639; 568/644
[58] Field of Search .................. 568/630, 631, 568/634, 636, 637, 646, 639, 654, 657, 644

[56] References Cited

U.S. PATENT DOCUMENTS

| | | | |
|---|---|---|---|
| 4,450,308 | 5/1984 | Forster et al. | 568/637 |
| 4,542,243 | 9/1985 | Umemoto et al. | 568/636 |
| 4,992,593 | 2/1991 | Siegemund | 568/637 |

FOREIGN PATENT DOCUMENTS 01262 2/1988 WIPO .................. 568/646

*Primary Examiner*—Werren B. Lone
*Attorney, Agent, or Firm*—George F. Helfrich

[57] ABSTRACT

Poly(arylene ether)s containing pendent ethynyl and substituted ethynyl groups and poly(arylene ether) copolymers containing pendent ethynyl and substituted ethynyl groups are readily prepared from bisphenols containing ethynyl and substituted ethynyl groups. The resulting polymers are cured up to 350° C. to provide crosslinked poly(arylene ether)s with good solvent resistance, high strength and modulus.

2 Claims, 4 Drawing Sheets

88% yield (Br)
[81% yield (I)]

(reflux)

m.p. 187–189°C, 80% yield (Br)
[m.p. 210–212°C, 77% yield (I)]

where R = H, C$_4$H$_9$, ⌬ where R = H, $C_4H_9$, <phenyl>

POLY(ARYLENE ETHER)S CONTAINING PENDENT ETHYNYL GROUPS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates to a series of new bisphenols containing pendent ethynyl groups and new poly(arylene ether)s containing pendent ethynyl groups. These bisphenols are reacted with activated dihalide monomers to form poly(arylene ether)s with pendent ethynyl groups. Upon heating, the pendent ethynyl groups react to form crosslinked resins that are useful as adhesives, composite matrices, moldings and films.

2. Description of Related Art

Poly(arylene ether)s are condensation polymers that can be prepared by various routes. The most popular route involves the reaction of an aromatic bisphenol with an activated aromatic dihalide to form the polymer which has a repeat unit of the general type

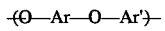

where Ar is a divalent aromatic radical, which can be as simple as 1,3- or 1,4-disubstituted benzene, or it may be a bis-3 or 4-(diphenylene) having the general structure

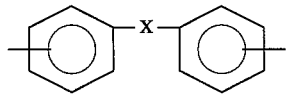

where X=nil, O, S, $SO_2$, C=O, $C(CH_3)_2$, $C(CF_3)_2$, etc. Ar may be any other appropriate divalent radical. Ar' is a divalent aromatic which contains an electron withdrawing activating group para to the halide to be displaced. Ar' has the general structure

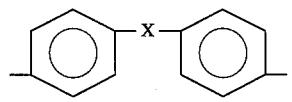

where X=$SO_2$, C=O, etc.

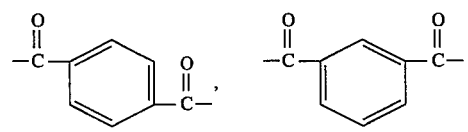

Synthesis and characterization of poly(arylene ether)s containing ethynyl groups have been reported in the literature and summarized in two reviews [P. M. Hergenrother, *J. Macromol. Sci. Rev. Macromol. Chem.*, C19, 1 (1980) and P. M. Hergenrother, in H. Mark, ed., *Encyclopedia of Polymer Science and Engineering*, 2nd ed., Vol. 1, John Wiley & Sons, Inc., New York, 61 (1985)]. Ethynyl and substituted ethynyl groups have been placed on the ends of oligomers and pendent along the backbone of polymers and thermally reacted to induce chain extension, rigidization, branching and/or crosslinking. More recently, a series of phenylethynyl terminated arylene ether oligomers having good melt stability were prepared and thermally reacted to yield polymers exhibiting excellent solvent resistance and high adhesive properties [R. G. Bryant, B. J. Jensen and P. M. Hergenrother, *Polym. Prepr.*, 33(1), 910 (1992)].

SUMMARY OF INVENTION

According to the present invention, a series of novel bisphenols containing pendent ethynyl groups were synthesized having the following general structure:

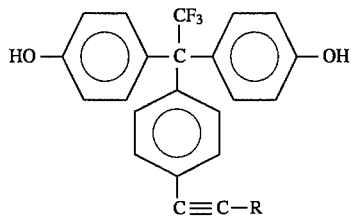

where R=H, n-$C_4H_9$—, and $C_6H_5$—, These bisphenols contain an ethynyl or substituted ethynyl group which a thermal reaction with other ethynyl groups at temperatures from ~150° C. to ~400° C., depending on the R group. In comparing the curing behavior of two different materials, when R=H, differential scanning calorimetry at a heating rate of 20° C./minute indicates the reaction is initiated at ~225° C. and is complete after 0.5 h at 250° C.; but if R=f, the reaction initiates at slightly less than 350° C. and is complete after a short period (<1 h) at 350° C. Other R groups would be expected to have different reaction initiation temperatures. The bisphenols can react with activated dihalides or activated dinitro compounds to form arylene ethers, or react with acid chlorides to form esters. Since these bisphenols are difunctional, they can react with other difunctional compounds to form polymers.

Poly(arylene ether)s are prepared from the reaction of the ethynyl containing bisphenols with activated difluoro monomers. Upon heating these polymers at elevated temperatures, the ethynyl groups react with one another to form a crosslinked structure. The advantage of poly(arylene ether)s containing pendent ethynyl groups compared to linear poly(arylene ether)s is the ability to react forming a crosslinked structure which typically increases the solvent resistance, glass transition temperature, and modulus. These properties are important for various applications as films, moldings, adhesives and composites.

The advantage of poly(arylene ether)s containing pendent ethynyl groups compared to acetylene-terminated arylene ether oligomers (ATAE) is that the poly(arylene ether)s containing pendent ethynyl groups are high molecular weight and form tough films before the ethynyl crosslinking reaction takes place. The ATAEs typically form brittle films. Furthermore, the crosslink density of the cured resins from poly(arylene ether)s containing pendent ethynyl groups can be controlled by copolymerizing bisphenol without ethynyl groups and bisphenol containing the pendent ethynyl groups to form high molecular weight polymers. With ATAEs the crosslink density can be varied only by changing the molecular weight of the oligomer, which affects the ability to make films and moldings.

An object of this invention is to provide a bisphenol containing a pendent ethynyl group.

Another object of this invention is to provide a bisphenol containing a pendent phenylethynyl group.

Another object of this invention is to provide bisphenols containing pendent substituted ethynyl groups.

Another object is to provide bisphenols containing pendent ethynyl groups which undergo a crosslinking reaction at temperatures from ~150° C. to ~400° C.

Another object is to provide poly(arylene ether)s with pendent ethynyl or substituted ethynyl groups from the reaction of these bisphenols with activated dihalide monomers.

Another object is to provide poly(arylene ether)s containing pendent ethynyl groups which crosslink to form a network structure by heating at elevated temperatures.

Another object is to provide copolymers containing pendent ethynyl groups which crosslink to form a network structure by heating at elevated temperatures.

DESCRIPTION OF THE PREFERRED EMBODIMENTS

A series of novel bisphenols containing pendent ethynyl or substituted ethynyl groups were synthesized. These bisphenols have been reacted with various activated dihalide monomers to provide poly(arylene ether)s containing pendent ethynyl groups. Copoly(arylene ether)s of these bisphenols and other bisphenols have also been prepared. The poly(arylene ether)s and copoly(arylene ether)s have been characterized and mechanical properties determined on films. The polymers containing pendent ethynyl groups react to form insoluble films when heated above ~200° C. These crosslinked films also have high modulus and high temperature use properties due to the reaction of the ethynyl groups. Specific examples follow.

EXAMPLE 1

Figure 1:
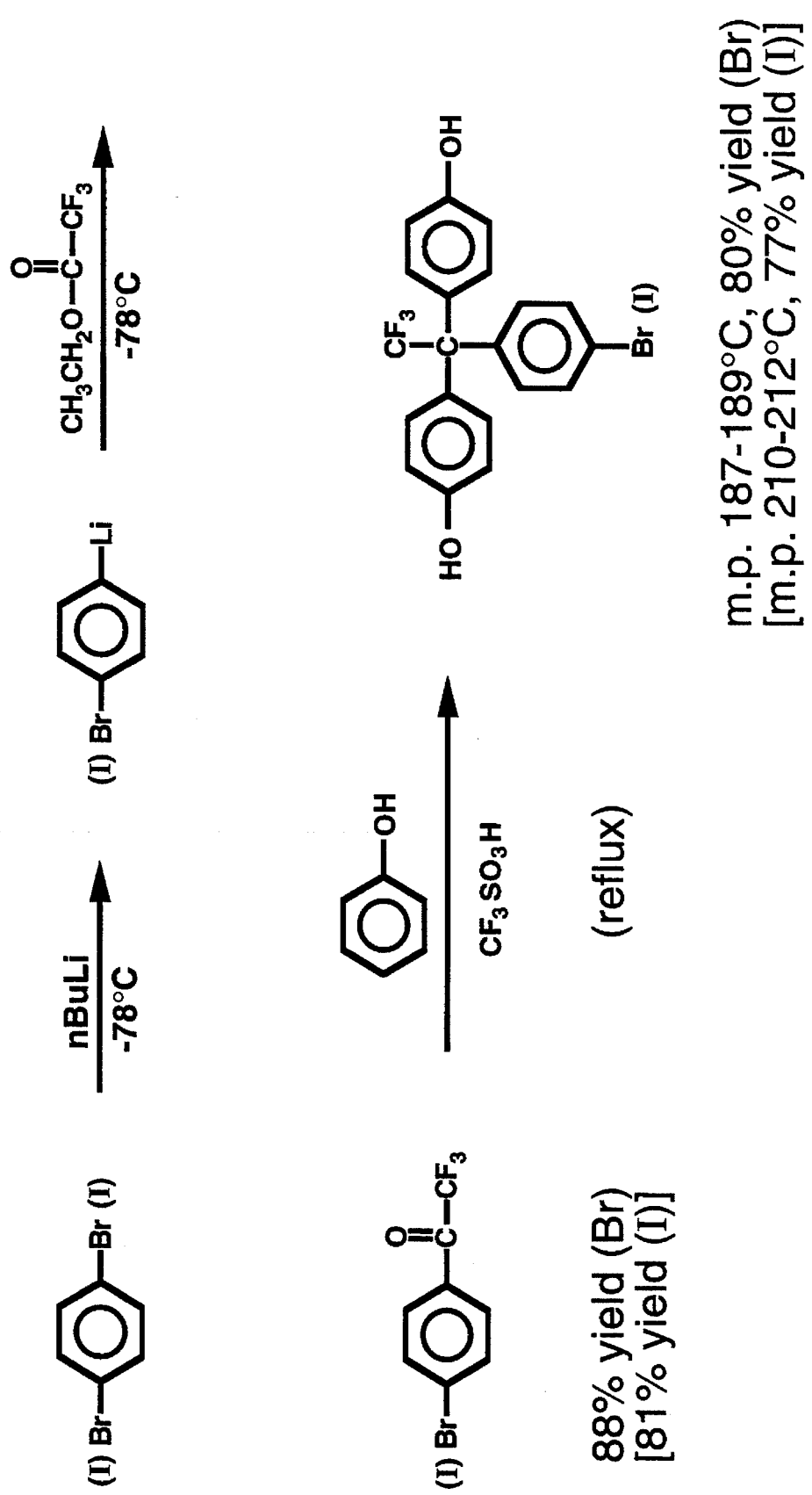
FIG. 1 is an equation showing the synthesis of 4-bromotrifluoroacetophenone and 1,1-bis(4-hydroxyphenyl)-1-(4 bromophenyl)-2,2,2-trifluoroethane according to the present invention.

Synthesis of 4-bromotrifluoroacetophenone (FIG. 1)

Into a flame-dried three-necked round bottomed flask, fitted with a pressure equalizing addition funnel and under nitrogen was added 1,4-dibromobenzene (20.04 g, 84.00 mmol). Using a syringe, 150 mL of anhydrous ether was added into the flask. Some of the 1,4-dibromobenzene dropped out of solution when the solution was cooled to −78° C. in a dry-ice/acetone bath. n-Butyl lithium(n-BuLi)(1.6M in hexane, 55 mL; 88 mmol) was introduced into the addition funnel with a syringe and the funnel was adjusted for dropwise addition of the n-BuLi solution into the reaction flask. The addition was completed in 30 min and the resulting white suspension was stirred at −78° C. for 2 h. After the two hours, the reaction vessel was removed from the bath and allowed to warm to 0° C. to ensure complete metal-halogen exchange. The reaction mixture changed from a suspension to a solution on warming. On recooling to −78° C., the suspension reappeared. To this white suspension was added dropwise, through the addition funnel, 13.47 g(95.00 mmol) of ethyl trifluoroacetate. The suspension became a solution before complete addition of the ester and the solution was left to warm to room temperature in about 12 h. To quench the reaction, the solution was cooled to between −30° and −20° C. and then 40 mL of aqueous saturated ammonium chloride ($NH_4Cl$) was added dropwise through the addition funnel. To ensure complete hydrolysis, 40 mL of 1N hydrochloric acid(HCl) was added and the mixture was allowed to warm to room temperature. The reaction mixture was transferred to a separatory funnel and the aqueous layer was removed. The ether solution was washed carefully with saturated aqueous sodium bicarbonate($NaHCO_3$), until all the acid was neutralized (no effervescence on adding fresh amounts of the aqueous bicarbonate). The ether solution was transferred to a flask and dried over anhydrous magnesium sulfate($MgSO_4$). Suction filtration, followed by rotary evaporation of the solvent, left a yellow-colored, slightly lachrimatory liquid which was vacuum distilled (0.2 Torr, 80° C.) to obtain 19.75 g (88%) of 4-bromotrifluoroacetophenone as a dense, colorless liquid. The liquid solidified on storing in the refrigerator. $^1H$ NMR: an AB quartet centered at 7.66 ppm. 4-Iodotrifluoroacetophenone was prepared by a similar procedure in 81% yield from p-diiodobenzene. $^1H$ NMR: an AB quartet centered at 7.65 ppm.

Synthesis of 4-bromotrifluoroacetophenone (FIG. 1)

4-Bromotrifluoroacetophenone (3.00 g, 12 mmol) and phenol (18.6 g, 20 mmol), trifluoromethanesulfonic acid (0.04 g, 2 mol %) and a magnetic stirrer were placed in a 250 mL single-neck round bottom flask equipped with a condensing column. The reaction mixture was heated to 100° C. and maintained at reflux for 48 h becoming a deep brown color. The reaction was steam distilled and the product formed a dark brown solid which was dissolved in warm methylene chloride. Addition of $MgSO_4$ and Norit-A with stirring and filtration provided a light orange solution. The solution was concentrated to about 65% of the original volume on a rotary evaporator and cooled in an ice bath. White crystals formed which were filtered and dried in a vacuum. A total of 4.0 g (80%) of product was collected: m.p. 187°–189° C. $^1H$ NMR (acetone-$d_6$): 6.6–7.0 (m, 8H); 7.3 (d, 4H); 8.3 (s, 2H); Mass Spectrum m/e (relative intensity) 422 ($M^+$, 20), 424 (20), 353 (100), 355 (100); Calc'd for $C_{20}H_{14}BrF_3O_2$: C, 56.76%; H, 3.33%; Found: C, 57.12%; H, 3.24%. 1,1-Bis(4-hydroxyphenyl)-1-(4-iodophenyl)-2,2,2-trifluoroethane (IBP) was prepared in a similar manner in 77% yield from 4-iodotrifluoroacetophenone: m.p. 210°–212° C. (after vacuum heat-drying). $^1H$ NMR (acetone-$d_6$): (s, 10H), 7.3–7.6 (d, 2H), 8.0 (br s, 2H); Mass Spectrum, m/e (relative intensity) 470 ($M^+$, 11), 401 (100); Calc'd for $C_{20}H_{14}IF_3O_2$: C, 51.09%; H, 3.00%; I, 26.99%; Found: C 50.84%; H, 2.98%; I, 27.16%.

EXAMPLE 3

Figure 2:
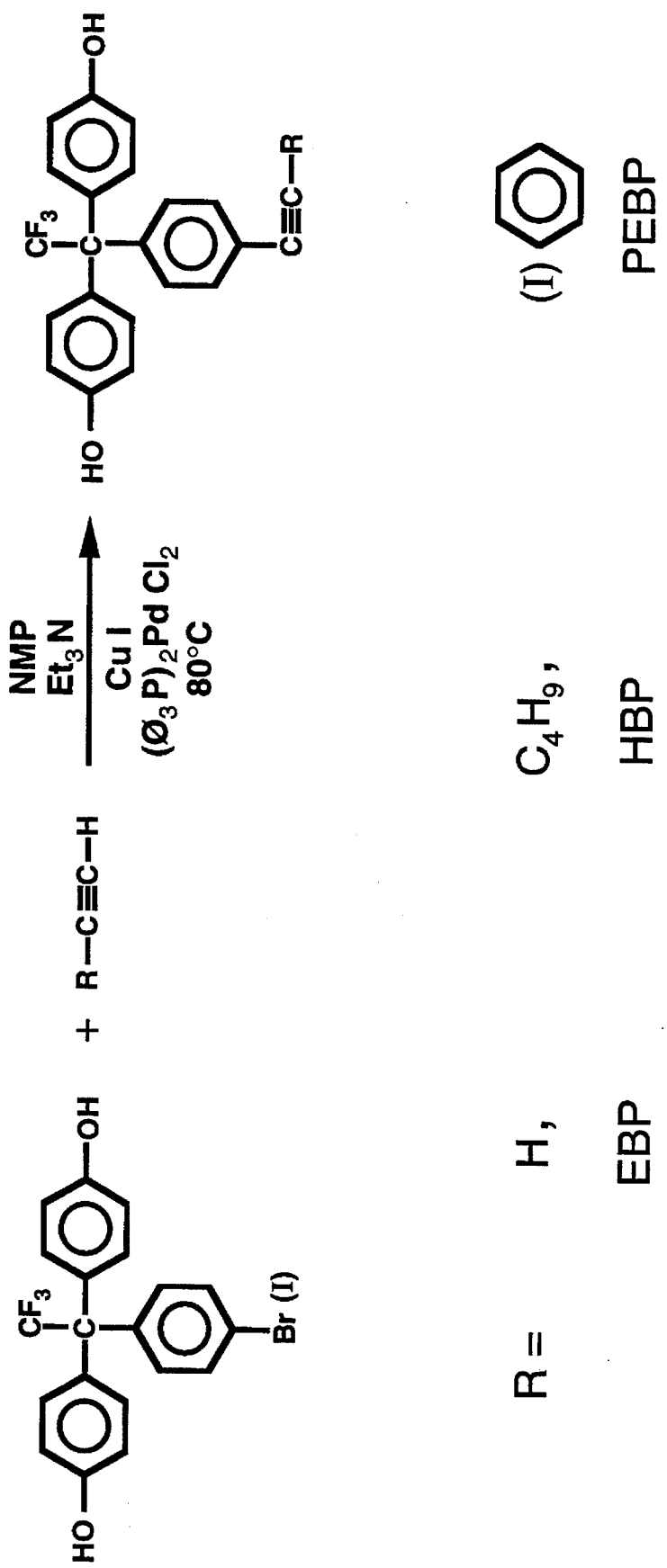
FIG. 2 is an equation showing the synthesis of 1,1-bis(4-hydroxyphenyl)-1-(4 ethynylphenyl)- 2,2,2-trifluoroethane, 1,1-bis(4-hydroxyphenyl)-1-(4 phenylethynylphenyl)-2,2,2-trifluoroethane and 1,1-bis(4-hydroxyphenyl)-1-(4-hexynylphenyl)-2,2,2-trifluoroethane according to the present invention.

Synthesis of 1,1-bis(4-hydroxyphenyl)-1-(4-ethynylphenyl)-2,2,2-trifluoroethane (EBP)(FIG. 2)

Into a 50 mL single-neck round bottom flask were added 1,1-bis(4-hydroxphenyl)- 1-(4-bromophenyl)-2,2,2-trifluoroethane (3.00 g, 7.1 mmol), triethylamine (40 mL), copper(I)iodide (CuI, 0.054 g, 0.28 retool, 4 mol %), tetrakis(triphenylphosphine)palladium(0) (0.33 g, 0.28 retool, 4 mol %) and trimethylsilylacetylene (1.39 g, 14.2 mmol). The solution was sealed in the flask with a rubber septum and the magnetically stirred mixture was heated at 80° C. A dark precipitate formed (the amine hydrobromide salt), which increased in quantity with time. After 48 h, the solvent mixture was filtered to remove the salt and transferred to a 250 mL flask whereby the triethylamine was removed on a rotary evaporator. The product was desilylated by stirring in methanol (80 mL) in the presence of $Na_2CO_3$ (2.12 g, 20 mmol) overnight at room temperature (RT). The reaction was filtered, the methanol removed on a rotary evaporator and 100 mL of 1N HCl was added to the flask. The acid solution was extracted with ether, dried over $MgSO_4$, then ether was removed to provide a solid which was purified by column chromatography using silica gel and a mixture of 80% benzene and 20% diethyl ether. After drying under vacuum, 2.2 g (73%) of product was recovered: m.p. 158°–160 ° C. $^1$H NMR (acetone-$d_6$): 1.00 (br s, 3H), 1.57 (br s, 4H), 2.33 (br s, 2H), 5.00 (br s, 2H), 6.66–7.33 (m, 12H), 8.33 (br s, 2H): $^1$H NMR ($CDCl_3$): 1.00 (br s, 3H), 1.57 (br s, 4H), 2.33 (br s, 2H), 5.00 (br s, 2H), 6.57–7.3 (m, 12H); Mass Spectrum, m/e (relative intensity): 368 ($M^+$, 23), 299 (100); Calc'd for $C_{22}H_{15}F_3O_2$: C, 71.73%; H, 4.10%; Found: C, 71.43%; H, 4.09%.

EXAMPLE 4

Synthesis of 1,1-bis(4-hydroxyphenyl)-1-(4-phenylethynylphenyl)-2,2,2-trifluoroethane (PEBP)(FIG. 2)

Into a 50 mL single-neck round bottom flask were added 1,1-bis(4-hydroxyphenyl)-1-(4-iodophenyl)-2,2,2-trifluoroethane (3.50 g, 7.40 mmol), phenylacetylene (1.51 g, 14.80 mmol, 100% excess), bis(triphenylphosphine)palladium(II) chloride (0.208 g, 0.300 mmol, 4 mol %), CuI (0.056 g, 0.300 mmol; 4 mol %) and triethylamine (30 mL). The solution was sealed in the flask with a rubber septum and the magnetically stirred mixture was heated at 80° C. A precipitate formed (the amine hydroiodide salt), which increased in quantity with time. After 48 h, the solvent mixture was filtered to remove the salt and transferred to a 250 mL flask whereby the triethylamine was removed on a rotary evaporator. The product was dissolved in diethyl ether and washed with 1N HCl followed by extraction with aqueous NaOH. The product was regenerated by the dropwise addition of HCl to the neutralization point, filtered, then redissolved in diethyl ether. After drying over $MgSO_4$, the ether was removed and the product was purified by column chromatography using silica gel and a mixture of 80 % benzene and 20% diethyl ether. After drying under vacuum at 80° C. for 1 h, 2.7 g (82%) of product was recovered: m.p. 205–207° C. $^1$H NMR acetone-$d_6$: 6.3–7.6(m, 17H), 8.3 (br s 2H); Mass Spectrum, m/e (relative intensity): 444 ($M^+$, 30), 375 (100); Calc'd for $C_{28}H_{19}F_3O_2$: C, 75.67%; H, 4.31%; found: C, 75.56%; H, 4.42%.

EXAMPLE 5

Synthesis of 1-Bis(4-hydroxyphenyl)-1-(4-hexynylphenyl)-2,2,2-trifluoroethane (HBP)(FIG. 2)

This compound was prepared from 1,1-(4-hydroxyphenyl)-1-(4-bromophenyl)-2,2,2-trifluoroethane and 1-hexyne by the same procedure as for the phenylethynylphenyl analog. After drying under vacuum at 80° C for 1 h, 2.2 g (73%) of product was recovered: m.p. 142°–144° C. $^1$H NMR (acetone-$d_6$): 3.6 (s, 1H), 6.6–7.39 (m, 12H), 8.3 (br s, 2H); $^1$H NMR ($CDCl_3$): 3.15 (s, 1H), 5.0 (br s, 2H); 6.6–7.6 (m, 12H); Mass Spectrum, m/e (relative intensity) 424 (M+, 20), 355 (100); Calc'd for $C_{28}H_{19}F_3O_2$: C, 73.57%; H, 5.46%. Found: C, 73.88%; H, 5.38%.

Synthesis of Polymers

Figure 3:
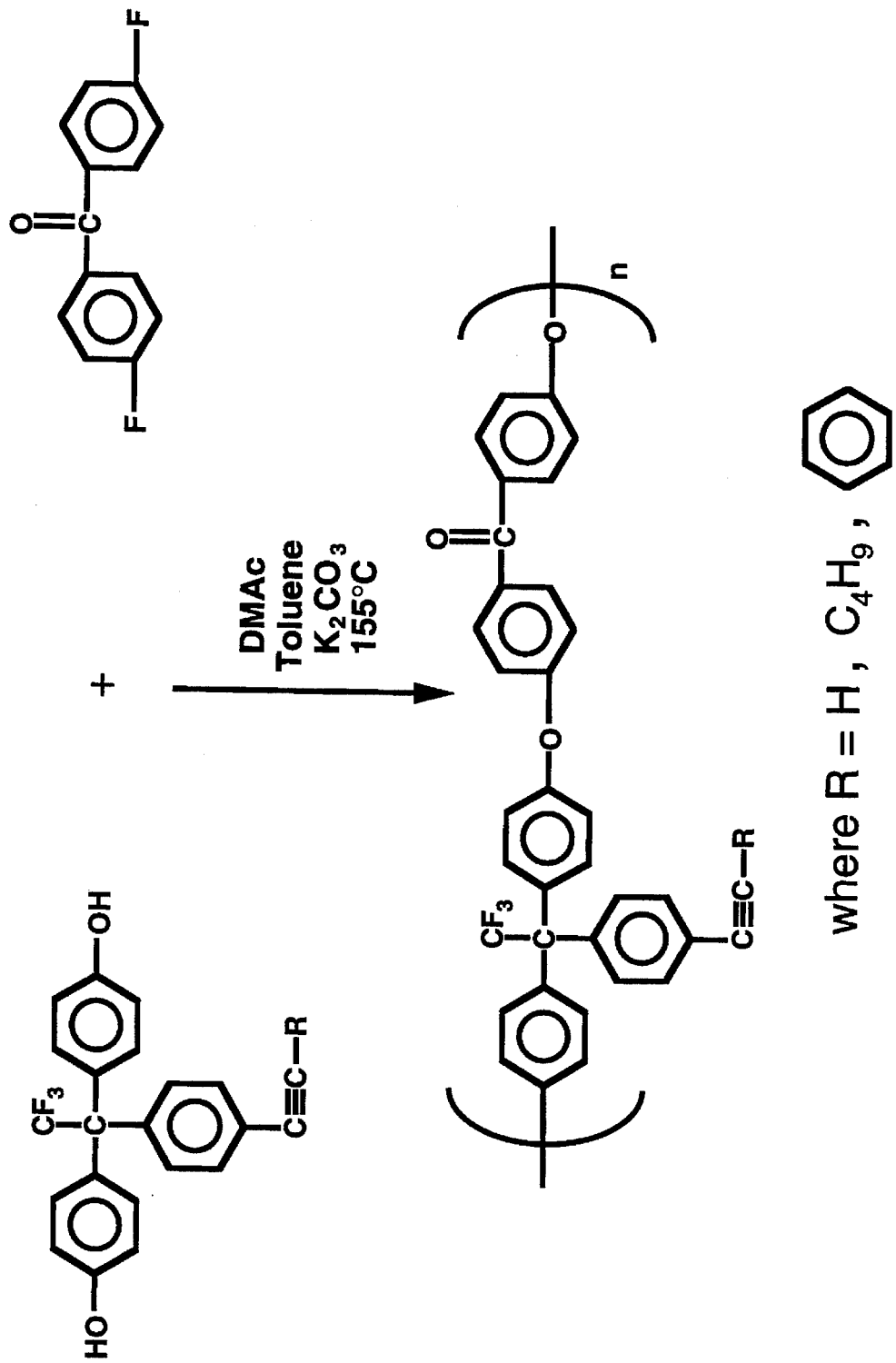
FIG. 3 is an equation showing the synthesis of polyarylene ethers according to the present invention.

The poly(arylene ether)s (PAE) were synthesized as shown in FIG. 3 by the nucleophilic substitution of DFB with a bisphenol using potassium carbonate in DMAc at 155° C. Toluene was added at the beginning of the reaction to form an azeotropic mixture with any water present in the reaction and maintain an anhydrous environment by collection in a Dean-Stark trap. Table 1 shows inherent viscosities ($\eta_{inh}$) of the PAE homopolymers. Specific examples of these polymers follow.

EXAMPLE 6

The following example illustrates the synthesis of PAE with pendent bromo groups. BBP ( 0.8465 g, 2.00 mmol), DFB (0.4364 g, 2.00 mmol), potassium carbonate (0.61 g, 4.40 mmol), toluene (12 mL) and DMAc (12 g) were added to a three-neck flask equipped with a stirring motor, nitrogen purge and Dean-Stark trap with a condenser. The reaction was heated to ~155° C. during 5 h and maintained at this temperature for 16 h. The reaction was filtered, neutralized with acetic acid and poured into water to form a white precipitate. The precipitate was washed in water and boiling methanol and dried at 100 ° C. overnight to provide a near-quantitative yield of polymer with inherent viscosity ($\eta_{inh}$) of 1.15 dL/g. The polymer was dissolved in chloroform (15% solids) and this solution was cast onto plate glass and cured in air for 1 h each at 100, 200 and 350° C. to form a film with a $T_g$ of 162° C. by differential scanning calorimetry (DSC) at a heating rate of 20° C./min. This film was completely soluble in DMAc or chloroform.

EXAMPLE 7

The following example illustrates the synthesis of PAE with pendent ethynyl groups. EBP ( 1.8418 g, 5.00 mmol), DFB (1.0910 g, 5.00 mmol), potassium carbonate (1.52 g, 11.0 mmol), toluene (20 mL) and DMAc (22 g) were added to a three-neck flask equipped with a stirring motor, nitrogen purge and Dean-Stark trap with a condenser. The reaction was heated to ~150° C. during 4 h, held for 1 h when the reaction appeared to gel. After diluting with DMAc (20 g), the reaction was held at ~150 for 16 h in an unsuccessful effort to dissipate the gel, indicating a reaction of the ethynyl groups during synthesis. Therefore, both reaction time and temperature were reduced in a effort to prepare high molecular weight, soluble polymers containing pendent ethynyl groups. When the reaction was held at or below ~145° C. for up to 4 h, high molecular weight polymer was not obtained. If the reaction temperature was allowed to increase even a few degrees (to ~148° C.), a gel would form within ~2 h. Several other attempts using different conditions were also unsuccessful in producing high molecular weight polymer.

EXAMPLE 8

The following example illustrates the synthesis of PAE with pendent hexynyl groups. HBP (2.1224 g, 5.00 mmol), DFB (1.0910 g, 5.00 mmol), potassium carbonate (1.52 g, 11.0 mmol), toluene (20 mL) and DMAc (18 g) were added to a three-neck flask equipped with a stirring motor, nitrogen purge and Dean-Stark trap with a condenser. The reaction was heated to ~150° C. during 4 h, held for 1 h when the reaction appeared to gel. After diluting with DMAc (20 g), the reaction was held at ~150 for 16 h in an unsuccessful effort to dissipate the gel, indicating a reaction of the hexynyl groups during synthesis. Therefore, both reaction time and temperature were reduced in a effort to prepare high molecular weight, soluble polymers containing pendent hexynyl groups. When the reaction was held at or below ~145° C. for up to 4 h, high molecular weight polymer was not obtained. If the reaction temperature was allowed to increase even a few degrees (to ~148° C.), a gel would form within ~2 h. Several other attempts using different conditions were also unsuccessful in producing high molecular weight polymer.

EXAMPLE 9

The following example illustrates the synthesis of PAE with pendent phenylethynyl groups. PEBP (2.2223 g, 5.00 mmol), DFB (1.0910 g, 5.00 mmol), potassium carbonate (1.52 g, 11.0 mmol), toluene (30 mL) and DMAc (21.7 g) were added to a three-neck flask equipped with a stirring motor, nitrogen purge and Dean-Stark trap with a condenser. The reaction was heated to ~155° C. during 5 h and maintained at this temperature for 16 h. The reaction was filtered, neutralized with acetic acid and poured into water to form a white precipitate. The precipitate was washed in water and boiling methanol and dried at 100° C. overnight to provide a polymer with inherent viscosity ($\eta_{inh}$) of 0.38 dL/g. The polymer was dissolved in chloroform (15% solids) and this solution was cast onto plate glass and cured in air for 1 h each at 100, 200 and 350° C. to form a yellow film with no $T_g$ detected by differential scanning calorimetry (DSC) at a heating rate of 20° C./min. This film was completely insoluble in DMAc or chloroform.

Synthesis of Copolymers

Figure 4:
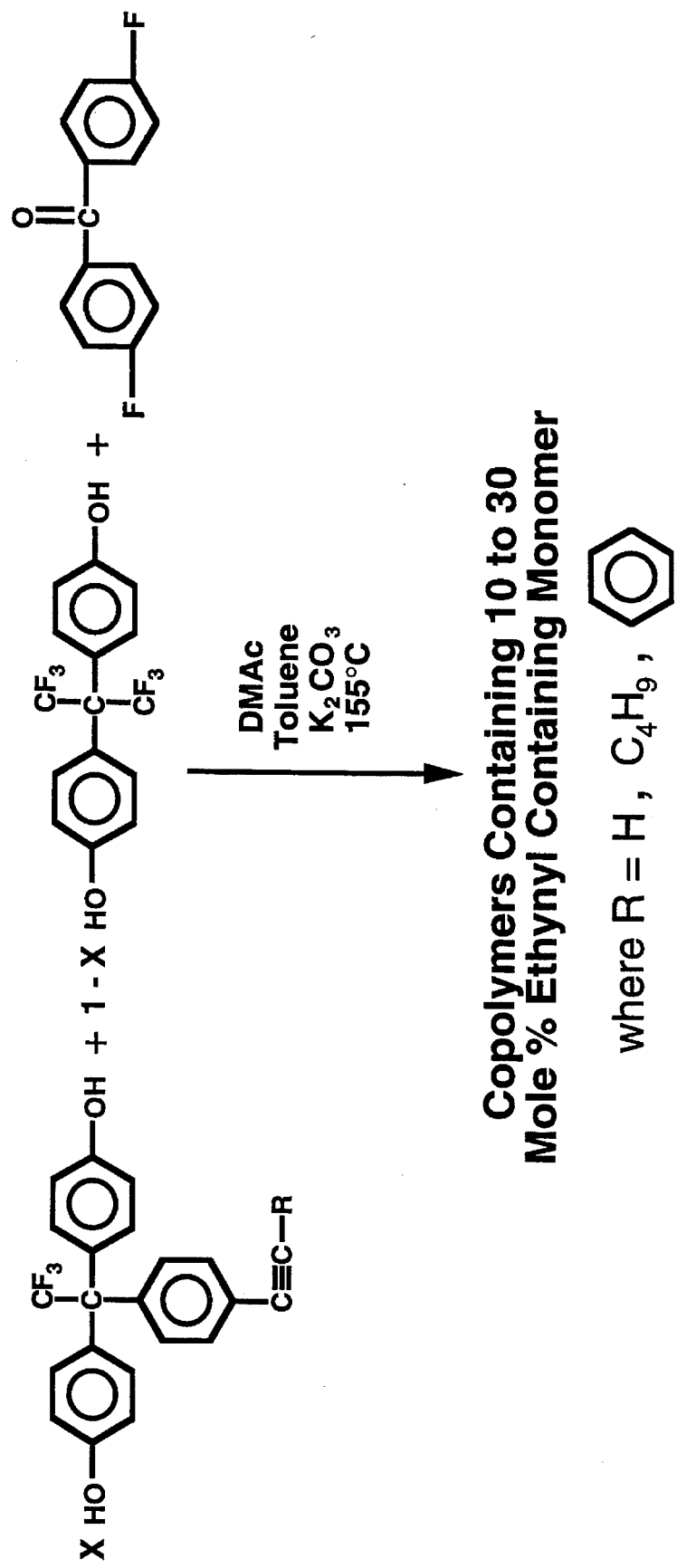
FIG. 4 is an equation showing the synthesis of arylene ether copolymers containing pendent ethynyl or substituted ethynyl groups according to the present invention.

Arylene ether copolymers containing pendent ethynyl or substituted ethynyl groups were prepared as shown in FIG. 4 using 10 or 30 mole % of the bisphenol containing a pendent ethynyl group and 90 or 70 mole %, respectively, of BPAF (a bisphenol without a pendent ethynyl group), although any ratio of these bisphenols could be used. Table 2 gives the $\eta_{inhs}$ and the original and final $T_g$s of these PAE copolymers. Table 3 gives data on the thermal stability and film properties (tensile strength, modulus and elongation) of the same copolymers. For reference, the homopolymer of BPAF and DFB is included and is soluble in DMAc and CHCl$_3$. When cured at 250°–350° C., the ethynyl groups react and the copolymers become insoluble in DMAc and CHCl$_3$. Specific examples of these copolymers follow.

EXAMPLE 10

The following example illustrates the synthesis of an PAE copolymer where one out of ten repeat units contains a pendent bromo group. BBP (0.4232 g, 1.00 mmol), BPAF (3.0262 g, 9.00 mmol), DFB (2.1821 g, 10.00 mmol), potassium carbonate (3.04 g, 22 mmol), toluene (30 mL) and DMAc (30 g) were added to a three-neck flask equipped with a stirring motor, nitrogen purge and Dean-Stark trap with a condenser. The reaction was heated to ~155° C. during 5 h and maintained at this temperature for 16 h. The reaction was filtered, neutralized with acetic acid and poured into water to form a white precipitate. The precipitate was washed in water and boiling methanol and dried at 100° C. overnight to provide a polymer with $\eta_{inh}$ of 1.4 dL/g. The polymer was dissolved in chloroform (15% solids) and this solution was cast onto plate glass and cured in air for 1 h each at 100°, 200° and 350° C. to form a fight yellow film with a $T_g$ of 170° C. by differential scanning calorimetry (DSC) at a heating rate of 20° C./min. This film was completely soluble in DMAc or chloroform.

EXAMPLE 11

The following example illustrates the synthesis of an PAE copolymer where one out of ten repeat units contains a pendent phenylethynyl group. PEBP (0.8889 g, 2.00 mmol), BPAF (6.0523 g, 18.00 mmol), DFB (4.3641 g, 20.00 mmol), potassium carbonate (6.08 g, 44 mmol), toluene (40 mL) and DMAc (40 g) were added to a three-neck flask equipped with a stirring motor, nitrogen purge and Dean-Stark trap with a condenser. The reaction was heated to ~155° C. during 5 h and maintained at this temperature for 16 h. The reaction was filtered, neutralized with acetic acid and poured into water to form a white precipitate. The precipitate was washed in water and boiling methanol and dried at 100° C. overnight to provide a polymer with $\eta_{inh}$ of 0.92 dL/g. The polymer was dissolved in chloroform (15% solids) and this solution was cast onto plate glass and cured in air for 1 h each at 100°, 200° and 350° C. to form a light yellow film with a $T_g$ of 179° C. by differential scanning calorimetry (DSC) at a heating rate of 20° C./min. This film was completely insoluble in DMAc or chloroform but did swell.

EXAMPLE 12

The following example illustrates the synthesis of an PAE copolymer where one out of ten repeat units contains a pendent ethynyl group. EBP (0.1842 g, 0.500 mmol), BPAF (1.5131 g, 4,500 mmol), DFB (1.0910 g, 5,000 mmol), potassium carbonate (1.52 g, 11 mmol), toluene (20 mL) and DMAc (22 g) were added to a three-neck flask equipped with a stirring motor, nitrogen purge and Dean-Stark trap with a condenser. The reaction was heated to ~150° C. during 5 h and maintained at this temperature for 2.5 h. The reaction was filtered, neutralized with acetic acid and poured into water to form a white precipitate. The precipitate was washed in water and boiling methanol and dried at 100 ° C. overnight to provide a polymer with $\eta_{inh}$ of 0.89 dL/g. The polymer was dissolved in chloroform (15% solids) and this solution was cast onto plate glass and cured in air for 1 h each at 100°, 200° and 350° C. to form a light yellow film with a $T_g$ of 185° C. by differential scanning calorimetry (DSC) at a heating rate of 20° C./min. This film was completely insoluble in DMAc or chloroform but did swell.

EXAMPLE 13

The following example illustrates the synthesis of an PAE copolymer where three out of ten repeat units contains a pendent phenylethynyl group. PEBP (2.0001 g, 4.500 mmol), BPAF (3.5305 g, 10.5 mmol), DFB (3.2731 g, 15.00 mmol), potassium carbonate (4.56 g, 33 mmol), toluene (40 mL) and DMAc (35 g) were added to a three-neck flask equipped with a stirring motor, nitrogen purge and Dean-Stark trap with a condenser. The reaction was heated to ~155° C. during 5 h and maintained at this temperature for 16 h. The reaction was filtered, neutralized with acetic acid and poured into water to form a white precipitate. The precipitate was washed in water and boiling methanol and dried at 100° C. overnight to provide a polymer with $\eta_{inh}$ of 0.52 dL/g. The polymer was dissolved in chloroform (15% solids) and this solution was cast onto plate glass and cured in air for 1 h each at 100°, 200° and 350° C. to form a light yellow film with a $T_g$ of 184° C. by differential scanning calorimetry (DSC.) at a heating rate of 20° C./min. This film was completely insoluble in DMAc or chloroform and showed only slight swelling.

TABLE 1

INHERENT VISCOSITY OF POLY(ARYLENE ETHER)S

| Bisphenol | Bisfluoro monomer | $\eta_{inh}$, dL/g |
|---|---|---|
| BBP | DFB | 1.15 |
| EBP | DFB | insoluble |
| HBP | DFB | Insoluble |
| PEBP | DFB | 0.38 |

TABLE 2

CHARACTERIZATION OF DFB/BPAF BASED COPOLYMERS

| Bisphenol with BPAF | $\eta_{inh}$, dL/g | DSC Tg, °C. Initial | DSC Tg, °C. Final[a] |
|---|---|---|---|
| 10% BBP | 1.4 | 170 | 170 |
| 10% EBP | 0.89 | 172 | 185 |
| 10% PEBP | 0.92 | 165 | 179 |
| 30% PEBP | 0.52 | 162 | 184 |
| 100% BPAF | 0.35 | 168 | 168 |

[a]After heating to 350° C. for 1 h.

TABLE 3

THERMAL STABILITY AND THIN FILM PROPERTIES OF POLYMERS AND COPOLYMERS

| Bisphenol Components | Temperature of 5 % Wt. Loss by TGA, °C. Air | Temperature of 5 % Wt. Loss by TGA, °C. N$_2$ | 23° C. Tensile Properties (150° C.) Strength, ksi | 23° C. Tensile Properties (150° C.) Modulus, ksi | 23° C. Tensile Properties (150° C.) Elongation, % |
|---|---|---|---|---|---|
| 10% BBP, 90% BPAF | 484 | 490 | 7.9 (4.2) | 261 (229) | 60 (76) |
| 10% EBP, 90% BPAF | 461 | 484 | 10.3 (4.9)[a] | 342 (260) | 6.1 (9.1) |
| 10% PEBP, 90% BPAF | 455 | 487 | 10.0 (4.9) | 284 (214) | 96 (180) |
| 30% PEBP, 70% BPAF | 452 | 484 | 9.5 (4.5) | 341 (232) | 4.8 (76) |
| 100% BPAF | 476 | 493 | 9.5 (4.0) | 325 (198) | 9.9 (1.3) |

We claim:

1. A poly(arylene ether) containing pendent ethynyl or substituted ethynyl groups prepared by reacting a bisphenol containing an ethynyl or substituted ethynyl group and having the structure

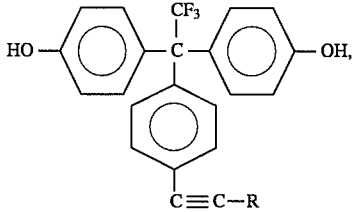

wherein R is selected from the group consisting of hydrogen, n-C$_4$H$_9$ and C$_6$H$_5$, with

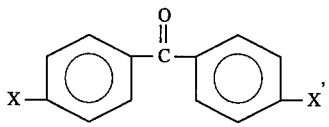

wherein X is a halogen.

2. A copoly(arylene ether) containing pendent ethynyl or substituted ethynyl groups prepared by reacting a mixture of a bisphenol containing an ethynyl or substituted ethynyl group and having the structure

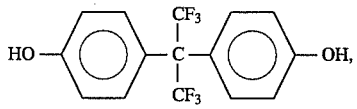

wherein R is selected from the group consisting of hydrogen, n,C$_4$H$_9$ and C$_6$H$_5$, and a bisphenol having no ethynyl or substituted ethynyl groups having the structure

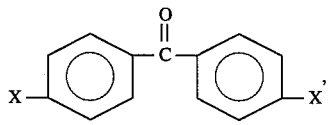

with

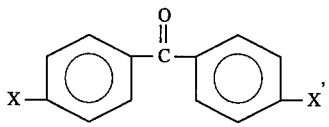

wherein X is a halogen.

* * * * *